United States Patent
Aase et al.

(10) Patent No.: US 9,276,392 B2
(45) Date of Patent: Mar. 1, 2016

(54) COMPRESSION MOLDED CABLE STRUCTURES AND METHODS FOR MAKING THE SAME

(75) Inventors: Jonathan Aase, Redwood City, CA (US); Paul Choiniere, Livermore, CA (US); Greg Dunham, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 473 days.

(21) Appl. No.: 13/013,540

(22) Filed: Jan. 25, 2011

(65) Prior Publication Data

US 2011/0180302 A1    Jul. 28, 2011

Related U.S. Application Data

(60) Provisional application No. 61/298,087, filed on Jan. 25, 2010, provisional application No. 61/384,103, filed on Sep. 17, 2010, provisional application No. 61/319,772, filed on Mar. 31, 2010, provisional application No. 61/384,097, filed on Sep. 17, 2010, provisional application No. 61/326,102, filed on Apr. 20, 2010, provisional application No. 61/349,768, filed on May 28, 2010, provisional application No. 61/378,311, filed on Aug. 30, 2010, provisional application No. 61/378,314, filed on Aug. 30, 2010.

(51) Int. Cl.
| | | |
|---|---|---|
| H02G 15/02 | (2006.01) | |
| H02G 15/18 | (2006.01) | |
| B29C 39/42 | (2006.01) | |
| B29C 43/18 | (2006.01) | |
| B29C 43/20 | (2006.01) | |
| B29C 43/36 | (2006.01) | |
| B29C 45/14 | (2006.01) | |
| B29C 33/10 | (2006.01) | |
| B29K 105/00 | (2006.01) | |
| B29K 705/00 | (2006.01) | |
| B29L 31/34 | (2006.01) | |

(52) U.S. Cl.
CPC ............... *H02G 15/18* (2013.01); *B29C 39/42* (2013.01); *B29C 43/18* (2013.01); *B29C 43/203* (2013.01); *B29C 43/36* (2013.01); *B29C 45/14073* (2013.01); *B29C 33/10* (2013.01); *B29C 2043/3605* (2013.01); *B29C 2043/3621* (2013.01); *B29C 2043/3665* (2013.01); *B29K 2105/256* (2013.01); *B29K 2705/00* (2013.01); *B29L 2031/3462* (2013.01)

(58) Field of Classification Search
USPC .......... 174/71 R, 72 R, 72 A, 120 R; 138/114
See application file for complete search history.

(56) References Cited

U.S. PATENT DOCUMENTS

| | | |
|---|---|---|
| 2,149,002 A | 2/1939 | Wermine |
| 2,628,998 A | 2/1953 | Frisbie |
| 2,937,228 A | 5/1960 | Robinson |
| 3,178,770 A | 4/1965 | Willis |
| 3,752,614 A | 8/1973 | Bremer |
| 3,758,700 A * | 9/1973 | Ditscheid .................... 174/28 |
| 3,928,519 A | 12/1975 | Kashiyama et al. |
| 4,110,394 A | 8/1978 | Shimada et al. |
| 4,385,203 A | 5/1983 | Faranetta et al. |
| 4,467,002 A * | 8/1984 | Crofts ..................... 428/34.9 |

(Continued)

*Primary Examiner* — Chau N Nguyen
(74) *Attorney, Agent, or Firm* — Brownstein Hyatt Farber Schreck, LLP

(57) ABSTRACT

Compression molded cable structures and systems and methods for manufacturing molded cable structures are disclosed.

17 Claims, 13 Drawing Sheets

(56) References Cited

U.S. PATENT DOCUMENTS

| | | |
|---|---|---|
| 4,646,872 A | 3/1987 | Kamon et al. |
| 4,879,807 A | 11/1989 | Roucaute |
| 4,924,037 A * | 5/1990 | Ainsworth et al. ........ 174/117 F |
| 5,021,611 A | 6/1991 | Amano |
| 5,113,039 A * | 5/1992 | Guipe et al. .............. 174/113 C |
| 5,283,392 A | 2/1994 | Ooshima et al. |
| 5,397,860 A | 3/1995 | Yochum et al. |
| 5,563,376 A | 10/1996 | Hansell et al. |
| 5,917,155 A * | 6/1999 | Hake et al. ................ 174/120 R |
| 5,945,052 A | 8/1999 | Schryver et al. |
| 6,050,847 A | 4/2000 | Kawakami et al. |
| 6,291,770 B1 * | 9/2001 | Casperson ................. 174/72 A |
| 6,392,155 B1 | 5/2002 | Shimizu et al. |
| 6,644,117 B1 | 11/2003 | Kueck et al. |
| D526,642 S | 8/2006 | Choe |
| 7,288,000 B2 | 10/2007 | Liu et al. |
| 7,314,999 B2 | 1/2008 | Dobler |
| D605,628 S | 12/2009 | Ando |
| 8,249,286 B2 | 8/2012 | Nault |
| 8,308,505 B2 | 11/2012 | Hatton et al. |
| 8,363,873 B2 | 1/2013 | Liu et al. |
| 2002/0017392 A1 | 2/2002 | Efaimsson et al. |
| 2005/0103518 A1 * | 5/2005 | Glew ....................... 174/113 R |
| 2010/0104126 A1 | 4/2010 | Greene |

* cited by examiner

LOW PRESSURE VACUUM

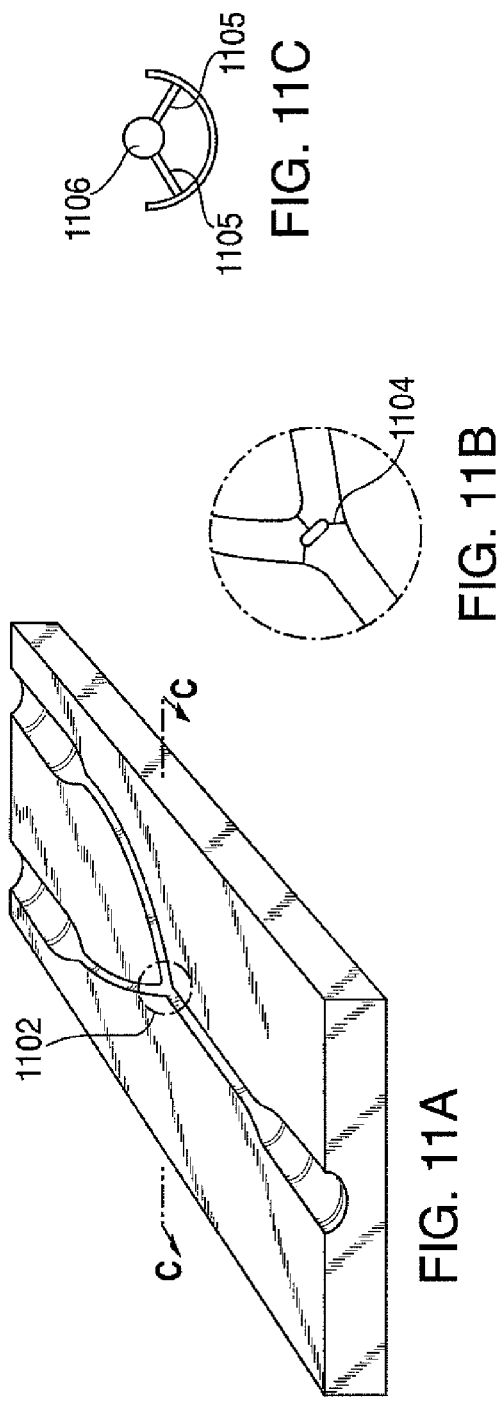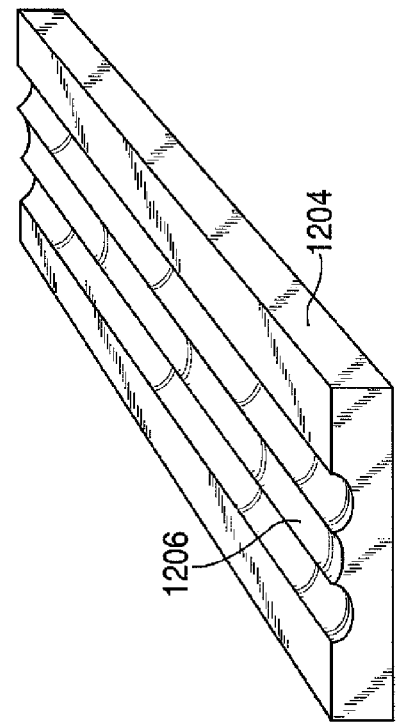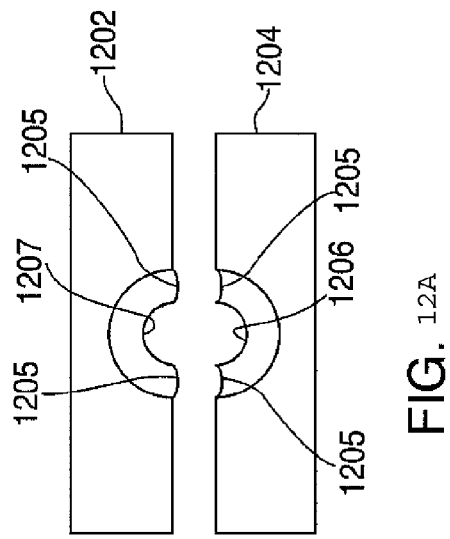

COMPRESSION MOLDED CABLE STRUCTURES AND METHODS FOR MAKING THE SAME

CROSS-REFERENCE TO RELATED APPLICATIONS

This application claims the benefit of previously filed U.S. Provisional Patent Application No. 61/298,087, filed Jan. 25, 2010, entitled "Small Diameter Cable with Splitter Assembly," U.S. Provisional Patent Application No. 61/384,103, filed Sep. 17, 2010, entitled "Molded Splitter Structures and Systems and Methods for Making the Same," U.S. Provisional Patent Application No. 61/319,772, filed Mar. 31, 2010, entitled "Thin Audio Plug and Coaxial Routing of Wires," U.S. Provisional Patent Application No. 61/384,097, filed Sep. 17, 2010, entitled "Cable Structures and Systems Including Super-Elastic Rods and Methods for Making the Same," U.S. Provisional Patent Application No. 61/326,102, filed Apr. 20, 2010, entitled "Audio Plug with Core Structural Member and Conductive Rings," U.S. Provisional Patent Application No. 61/349,768, filed May 28, 2010, entitled "Molding an Electrical Cable Having Centered Electrical Wires," U.S. Provisional Patent Application No. 61/378,311, filed Aug. 30, 2010, entitled "Molded Cable Structures and Systems and Methods for Making the Same," and U.S. Provisional Application No. 61/378,314, filed Aug. 30, 2010, entitled "Extruded Cable Structures and Systems and Methods for Making the Same." Each of these provisional applications is incorporated by reference herein in their entireties.

BACKGROUND

Wired headsets are commonly used with many portable electronic devices such as portable music players and mobile phones. Headsets can include non-cable components such as a jack, headphones, and/or a microphone and one or more cables that interconnect the non-cable components. The cables can be manufactured using different approaches.

SUMMARY

Compression molded cable structures and methods for manufacturing molded cable structures are disclosed.

A cable structure can interconnect various non-cable components of a headset such as, for example, a plug, headphones, and/or a communications box to provide a headset. The cable structure can include several legs (e.g., a main leg, a left leg, and a right leg) that each connect to a non-cable structure, and each leg may be connected to one another at a bifurcation region (e.g., a region where the main leg appears to split into the left and right legs). Cable structures according to embodiments of this invention provide aesthetically pleasing interface connections between the non-cable components and legs of the cable structure, for example such that the interface connections appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another can exhibit a substantially smooth variation in diameter along the length of the legs of the cable structure.

The interconnection of the three legs at the bifurcation region can vary depending on how the cable structure is manufactured. In one approach, the cable structure can be a single-segment unibody cable structure. In this approach, all three legs are jointly formed, for example using an extrusion process, and no additional processing is required to electrically couple the conductors contained therein. In another approach, the cable structure can be a multi-segment unibody cable structure. In this approach, the legs may be manufactured as discrete segments, but require additional processing to electrically couple conductors contained therein. In some embodiments, the segments can be joined together using a splitter.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 11A-C show different views of an illustrative silicon sheet in accordance with an embodiment of the invention;

FIGS. 12A-B show different views of an illustrative silicon sheet in accordance with an embodiment of the invention.

DETAILED DESCRIPTION OF THE DISCLOSURE

Figure 1A:
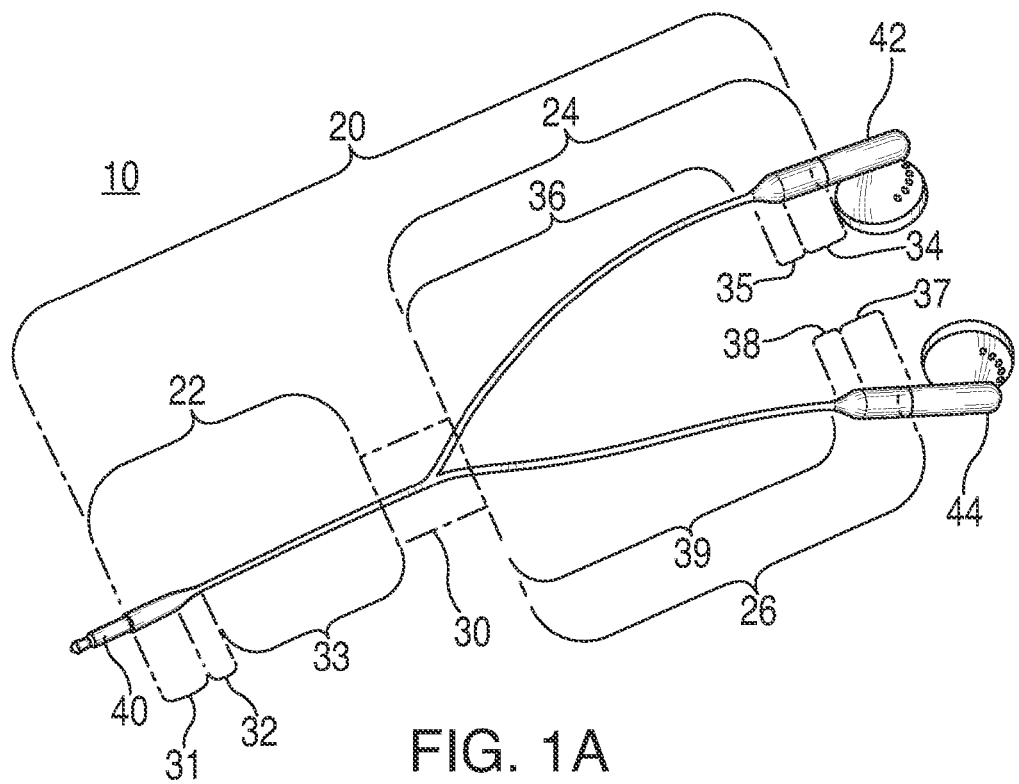
FIGS. 1A and 1B illustrate different headsets having a cable structure that seamlessly integrates with non-cable components in accordance with some embodiments of the invention.

Cable structures for use in headsets are disclosed. The cable structure interconnects various non-cable components of a headset such as, for example, a plug, headphones, and/or a communications box to provide a headset. The cable structure can include multiple legs (e.g., a main leg, a left leg, and a right leg) that each connect to a non-cable structure, and each leg may be connected to each other at a bifurcation region (e.g., a region where the main leg appears to split into the left and right legs). Cable structures according to embodiments of this invention provide aesthetically pleasing interface connections between the non-cable components and legs of the cable structure. The interface connections between a leg and a non-cable component are such that they appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another is accomplished in a manner that maintains the spirit of the seamless interface connection between a leg and the non-cable component throughout the length of the leg. That is, each leg of the cable structure exhibits a substantially smooth surface, including the portion of the leg having a varying diameter. In some embodiments, the portion of the leg varying in diameter may be represented mathematically by a bump function, which requires all aspects of the variable diameter transition to be smooth. In other words, a cross-section of the variable diameter portion can show a curve or a curve profile.

The interconnection of the three legs at the bifurcation region can vary depending on how the cable structure is manufactured. In one approach, the cable structure can be a single-segment unibody cable structure. In this approach, all three legs are jointly formed and no additional processing is required to electrically couple the conductors contained therein. Construction of the single-segment cable may be such that the bifurcation region does not require any additional support. If additional support is required, an over-mold can be used to add strain relief to the bifurcation region.

In another approach, the cable structure can be a multi-segment unibody cable structure. In this approach, the legs may be manufactured as discrete segments, but require additional processing to electrically couple conductors contained therein. The segments can be joined together using a splitter. Many different splitter configurations can be used, and the use of some splitters may be based on the manufacturing process used to create the segment.

The cable structure can include a conductor bundle that extends through some or all of the legs. The conductor bundle can include conductors that interconnect various non-cable components. The conductor bundle can also include one or more rods constructed from a superelastic material. The superelastic rods can resist deformation to reduce or prevent tangling of the legs.

The cable structure can be constructed using many different manufacturing processes. The processes include injection molding, compression molding, and extrusion. In injection and compression molding processes, a mold is formed around a conductor bundle or a removable rod. The rod is removed after the mold is formed and a conductor bundle is threaded through the cavity. In extrusion processes, an outer shell is formed around a conductor bundle.

FIG. 1A shows an illustrative headset 10 having cable structure 20 that seamlessly integrates with non-cable components 40, 42, 44. For example, non-cable components 40, 42, and 44 can be a male plug, left headphones, and right headphones, respectively. Cable structure 20 has three legs 22, 24, and 26 joined together at bifurcation region 30. Leg 22 may be referred to herein as main leg 22, and includes the portion of cable structure 20 existing between non-cable component 40 and bifurcation region 30. In particular, main leg 22 includes interface region 31, bump region 32, and non-interface region 33. Leg 24 may be referred to herein as left leg 24, and includes the portion of cable structure 20 existing between non-cable component 42 and bifurcation region 30. Leg 26 may be referred to herein as right leg 26, and includes the portion of cable structure 20 existing between non-cable component 44 and bifurcation region 30. Both left and right legs 24 and 26 include respective interface regions 34 and 37, bump regions 35 and 38, and non-interface regions 36 and 39.

Legs 22, 24, and 26 generally exhibit a smooth surface throughout the entirety of their respective lengths. Each of legs 22, 24, and 26 can vary in diameter, yet still retain the smooth surface.

Non-interface regions 33, 36, and 39 can each have a predetermined diameter and length. The diameter of non-interface region 33 (of main leg 22) may be larger than or the same as the diameters of non-interface regions 36 and 39 (of left leg 24 and right leg 26, respectively). For example, leg 22 may contain a conductor bundle for both left and right legs 24 and 26 and may therefore require a greater diameter to accommodate all conductors. In some embodiments, it is desirable to manufacture non-interface regions 33, 36, and 39 to have the smallest diameter possible, for aesthetic reasons. As a result, the diameter of non-interface regions 33, 36, and 39 can be smaller than the diameter of any non-cable component (e.g., non-cable components 40, 42, and 44) physically connected to the interfacing region. Since it is desirable for cable structure 20 to seamlessly integrate with the non-cable components, the legs may vary in diameter from the non-interfacing region to the interfacing region.

Bump regions 32, 35, and 38 provide a diameter changing transition between interfacing regions 31, 34, and 37 and respective non-interfacing regions 33, 36, and 39. The diameter changing transition can take any suitable shape that exhibits a fluid or smooth transition from any interface region to its respective non-interface region. For example, the shape of the bump region can be similar to that of a cone or a neck of a wine bottle. As another example, the shape of the taper region can be stepless (i.e., there is no abrupt or dramatic step change in diameter, nor a sharp angle at an end of the bump region). Bump regions 32, 35, and 38 may be mathematically represented by a bump function, which requires the entire diameter changing transition to be stepless and smooth (e.g., the bump function is continuously differentiable).

Figure 1B:
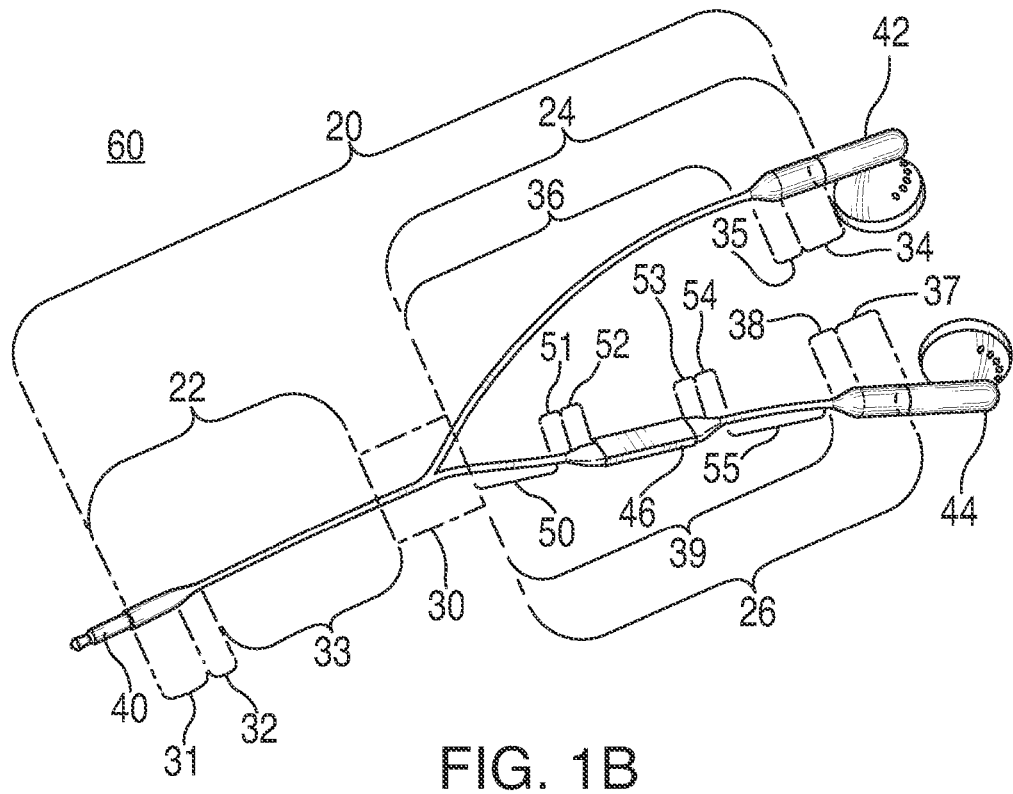
Figure 1C:
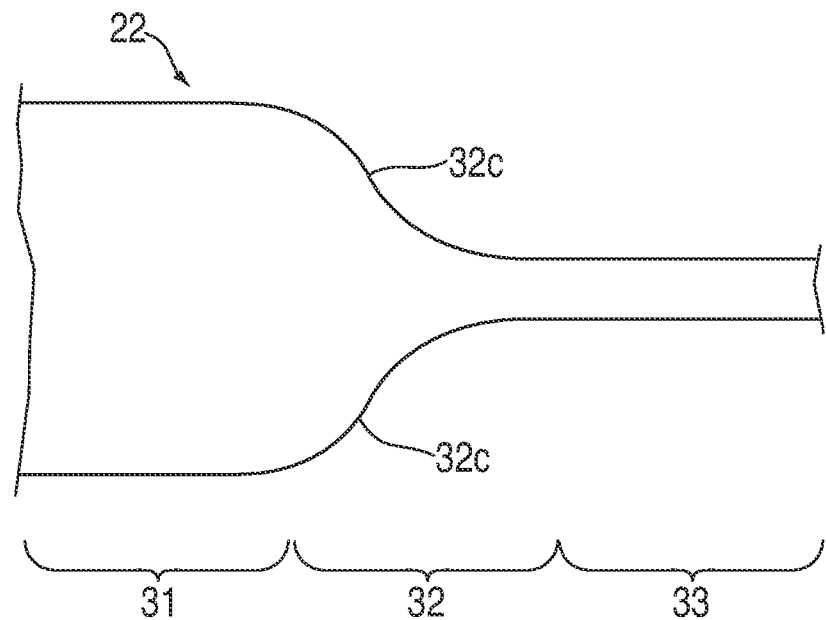
FIGS. 1C and 1D show illustrative cross-sectional views of a portion of a leg in accordance with some embodiments of the invention.
Figure 1D:
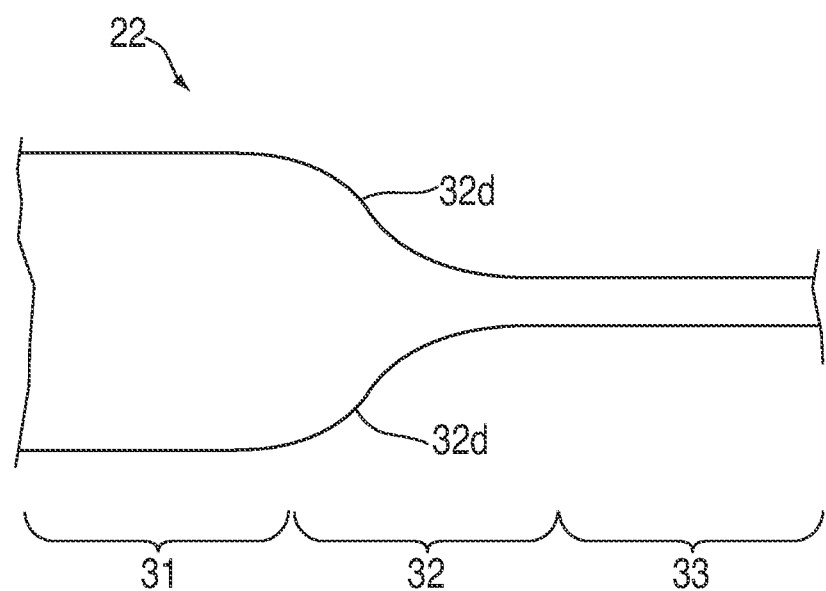

FIGS. 1C and 1D show illustrative cross-sectional views of a portion of main leg 22 in accordance with embodiments of the invention. Both FIGS. 1C and 1D show main leg 22 with a center axis (as indicated by the dashed line) and symmetric curves 32c and 32d. Curves 32c and 32d illustrate that any suitable curve profile may be used in bump region 32. Thus the outer surface of bump region 32 can be any surface that deviates from planarity in a smooth, continuous fashion.

Interface regions 21, 34, and 37 can each have a predetermined diameter and length. The diameter of any interface region can be substantially the same as the diameter of the non-cable component it is physically connected to, to provide an aesthetically pleasing seamless integration. For example, the diameter of interface region 21 can be substantially the same as the diameter of non-cable component 40. In some embodiments, the diameter of a non-cable component (e.g., component 40) and its associated interfacing region (e.g., region 31) are greater than the diameter of the non-interface region (e.g., region 33) they are connected to via the bump region (e.g., region 32). Consequently, in this embodiment, the bump region decreases in diameter from the interface region to the non-interface region.

In another embodiment, the diameter of a non-cable component (e.g., component 40) and its associated interfacing region (e.g., region 31) are less than the diameter of the non-interface region (e.g., region 33) they are connected to via the bump region (e.g., region 32). Consequently, in this embodiment, the bump region increases in diameter from the interface region to the non-interface region.

The combination of the interface and bump regions can provide strain relief for those regions of headset 10. In one embodiment, strain relief may be realized because the interface and bump regions have larger dimensions than the non-interface region and thus are more robust. These larger dimensions may also ensure that non-cable portions are securely connected to cable structure 20. Moreover, the extra girth better enables the interface and bump regions to withstand bend stresses.

The interconnection of legs 22, 24, and 26 at bifurcation region 30 can vary depending on how cable structure 20 is manufactured. In one approach, cable structure 20 can be a single-segment unibody cable structure. In this approach all three legs are manufactured jointly as one continuous structure and no additional processing is required to electrically couple the conductors contained therein. That is, none of the legs are spliced to interconnect conductors at bifurcation region 30, nor are the legs manufactured separately and then later joined together. Some single-segment unibody cable structures may have a top half and a bottom half, which are molded together and extend throughout the entire unibody cable structure. For example, such single-segment unibody cable structures can be manufactured using injection molding and compression molding manufacturing processes (discussed below in more detail). Thus, although a mold-derived single-segment unibody cable structure has two components (i.e., the top and bottom halves), it is considered a single-segment unibody cable structure for the purposes of this disclosure. Other single-segment unibody cable structures may exhibit a contiguous ring of material that extends throughout the entire unibody cable structure. For example, such a single-segment cable structure can be manufactured using an extrusion process.

In another approach, cable structure 20 can be a multi-segment unibody cable structure. A multi-segment unibody cable structure may have the same appearance of the single-segment unibody cable structure, but the legs are manufactured as discrete components. The legs and any conductors contained therein are interconnected at bifurcation region 30. The legs can be manufactured, for example, using any of the processes used to manufacture the single-segment unibody cable structure.

The cosmetics of bifurcation region 30 can be any suitable shape. In one embodiment, bifurcation region 30 can be an overmold structure that encapsulates a portion of each leg 22, 24, and 26. The overmold structure can be visually and tactically distinct from legs 22, 24, and 26. The overmold structure can be applied to the single or multi-segment unibody cable structure. In another embodiment, bifurcation region 30 can be a two-shot injection molded splitter having the same dimensions as the portion of the legs being joined together. Thus, when the legs are joined together with the splitter mold, cable structure 20 maintains its unibody aesthetics. That is, a multi-segment cable structure has the look and feel of single-segment cable structure even though it has three discretely manufactured legs joined together at bifurcation region 30. Many different splitter configurations can be used, and the use of some splitters may be based on the manufacturing process used to create the segment.

Cable structure 20 can include a conductor bundle that extends through some or all of legs 22, 24, and 26. Cable structure 20 can include conductors for carrying signals from non-cable component 40 to non-cable components 42 and 44. Cable structure 20 can include one or more rods constructed from a superelastic material. The rods can resist deformation to reduce or prevent tangling of the legs. The rods are different than the conductors used to convey signals from non-cable component 40 to non-cable components 42 and 44, but share the same space within cable structure 20. Several different rod arrangements may be included in cable structure 20.

In yet another embodiment, one or more of legs 22, 24, and 26 can vary in diameter in two or more bump regions. For example, the leg 22 can include bump region 32 and another bump region (not shown) that exists at leg/bifurcation region 30. This other bump region may vary the diameter of leg 22 so that it changes in size to match the diameter of cable structure at bifurcation region 30. This other bump region can provide additional strain relief.

In some embodiments, another non-cable component can be incorporated into either left leg 24 or right leg 26. As shown in FIG. 1B, headset 60 shows that non-cable component 46 is integrated within leg 26, and not at an end of a leg like non-cable components 40, 42 and 44. For example, non-cable component 46 can be a communications box that includes a microphone and a user interface (e.g., one or more mechanical or capacitive buttons). Non-cable component 46 can be electrically coupled to non-cable component 40, for example, to transfer signals between communications box 46 and one or more of non-cable components 40, 42 and 44.

Non-cable component 46 can be incorporated in non-interface region 39 of leg 26. In some cases, non-cable component 46 can have a larger size or girth than the non-interface regions of leg 26, which can cause a discontinuity at an interface between non-interface region 39 and communications box 46. To ensure that the cable maintains a seamless unibody appearance, non-interface region 39 can be replaced by first non-interface region 50, first bump region 51, first interface region 52, communications box 46, second interface region 53, second bump region 54, and second non-interface region 55.

Similar to the bump regions described above in connection with the cable structure of FIG. 1A, bump regions 51 and 54 can handle the transition from non-cable component 46 to non-interface regions 50 and 55. The transition in the bump region can take any suitable shape that exhibits a fluid or smooth transition from the interface region to the non-interface regions. For example, the shape of the taper region can be similar to that of a cone or a neck of a wine bottle.

Similar to the interface regions described above in connection with the cable structure of FIG. 1A, interface regions 52 and 53 can have a predetermined diameter and length. The diameter of the interface region is substantially the same as the diameter of non-cable component 46 to provide an aesthetically pleasing seamless integration. In addition, and as described above, the combination of the interface and bump regions can provide strain relief for those regions of headset 10.

In some embodiments, non-cable component 46 may be incorporated into a leg such as leg 26 without having bump regions 51 and 54 or interface regions 52 and 53. Thus, in this embodiment, non-interfacing regions 50 and 55 may be directly connected to non-cable component 46.

Cable structures 20 can be constructed using many different manufacturing processes. The processes discussed herein include those that can be used to manufacture the single-segment unibody cable structure or legs for the multi-segment unibody cable structure. In particular, these processes include injection molding, compression molding, and extrusion. Embodiments of this invention use compression molding processes to manufacture a single-segment unibody cable structure or multi-segment unibody cable structures.

In one embodiment, a cable structure can be manufactured by compression molding two urethane sheets together to form the sheath of the cable structure. Using this manufacturing method, the finished cable structure has a bi-component sheath that encompasses a resin and a conductor bundle. The resin further encompasses the conductor bundle and occupies any void that exists between the conductor bundle and the inner wall of the bi-component cable. In addition, the resin secures the conductor bundle in place within the bi-component sheath.

Figure 2:
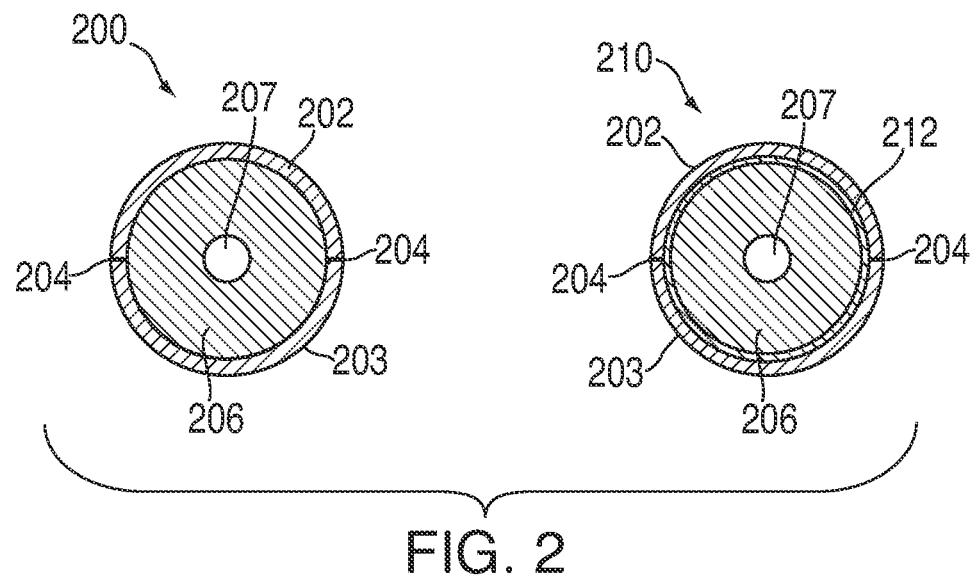
FIG. 2 shows cross-sectional views of a cable structure manufactured using urethane sheets in accordance with embodiments of the invention.

FIG. 2 shows illustrative cross-sectional views of two different cable structures that can be manufactured by compression molding two urethane sheets in accordance with embodiments of the invention. The illustrated cross-sectional views represent a cross-sectional view of a leg of either a single-segment or multi-segment cable structure. Cable structure 200 shows top sheath component 202 and bottom sheath component 203 formed together at mold interface regions 204. Molded together, components 202 and 203 form the bi-component sheath that encompasses resin 206 and conductor bundle 207. As shown, resin 206 encompasses conductor bundle 207 and directly interfaces with the inner wall of the bi-component sheath. Conductor bundle 207 can be co-axially aligned with a center axis of cable structure 200, though it is understood that due to manufacturing tolerances, conductor bundle 207 may be positioned off center in various portions of the bi-component sheath. Cable structure 200 can be manufactured using a direct wire inlaid bi-component sheath molding process, which is discussed below in more detail.

Cable structure 210 is similar in every respect to cable structure 200, except for the addition of tube sleeve 212. Tube sleeve 212 directly interfaces with the inner diameter of the bi-component sheath and resin 206. Cable structure 210 can be manufactured using a tube-inlaid bi-component sheath molding process, which is discussed below in more detail.

Figure 3A:
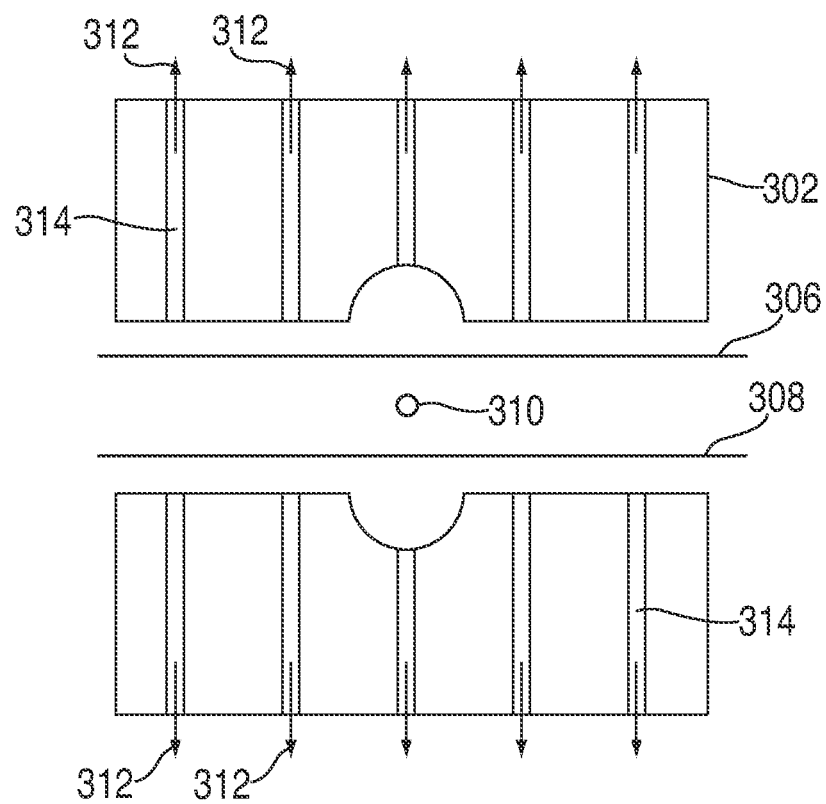
FIGS. 3A-C show illustrative views of a mold used to manufacture a cable structure in accordance with embodiments of the invention.

FIG. 3A shows a simplified exploded cross-sectional view of top mold 302, bottom mold 304, top urethane sheet 306, bottom urethane sheet 308, and inlaid component 310 used to manufacture a urethane-based cable structure according to an embodiment of the invention. Top and bottom molds 302 and 304 can be constructed to mold either a single-segment cable structure or a multi-segment cable structure. Top and bottom molds 302 and 304 each have a cavity for shaping the cable structure.

Figure 3B:
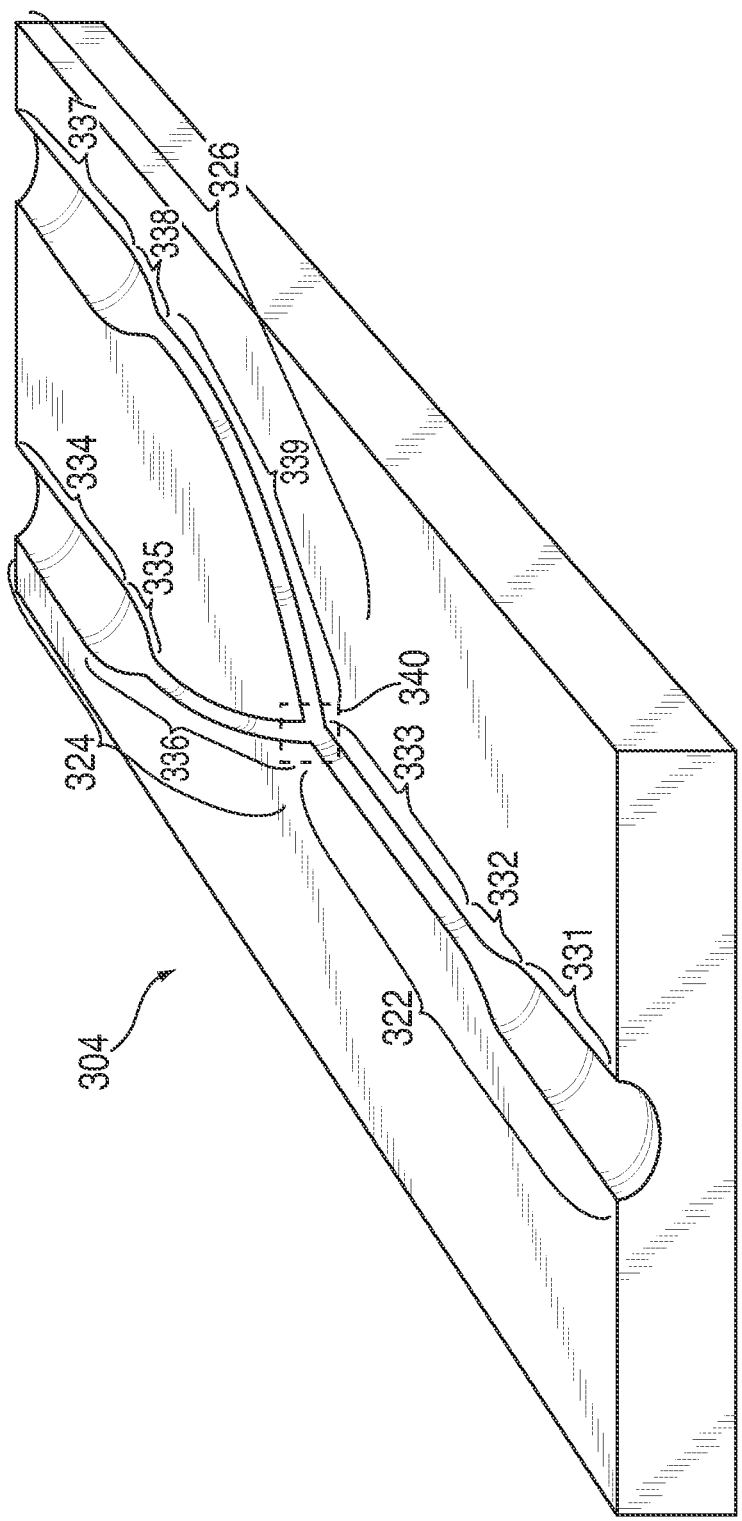

For example, FIG. 3B shows an illustrative bottom mold for jointly forming all three legs of a bottom-component sheath of a cable structure. As shown, bottom mold 304 includes main leg 322, which includes interface region 331, bump region 332, non-interface region 333, left leg 324, which includes interface region 334, bump region 335, non-interface region 336, and right leg 326, which includes interface region 337, bump region 338, and non-interface region 339. Legs 322, 324, and 326 are connected together at bifurcation region 340. If desired, the single-segment bottom mold can be constructed to yield more than one single-segment cable structure.

Figure 3C:
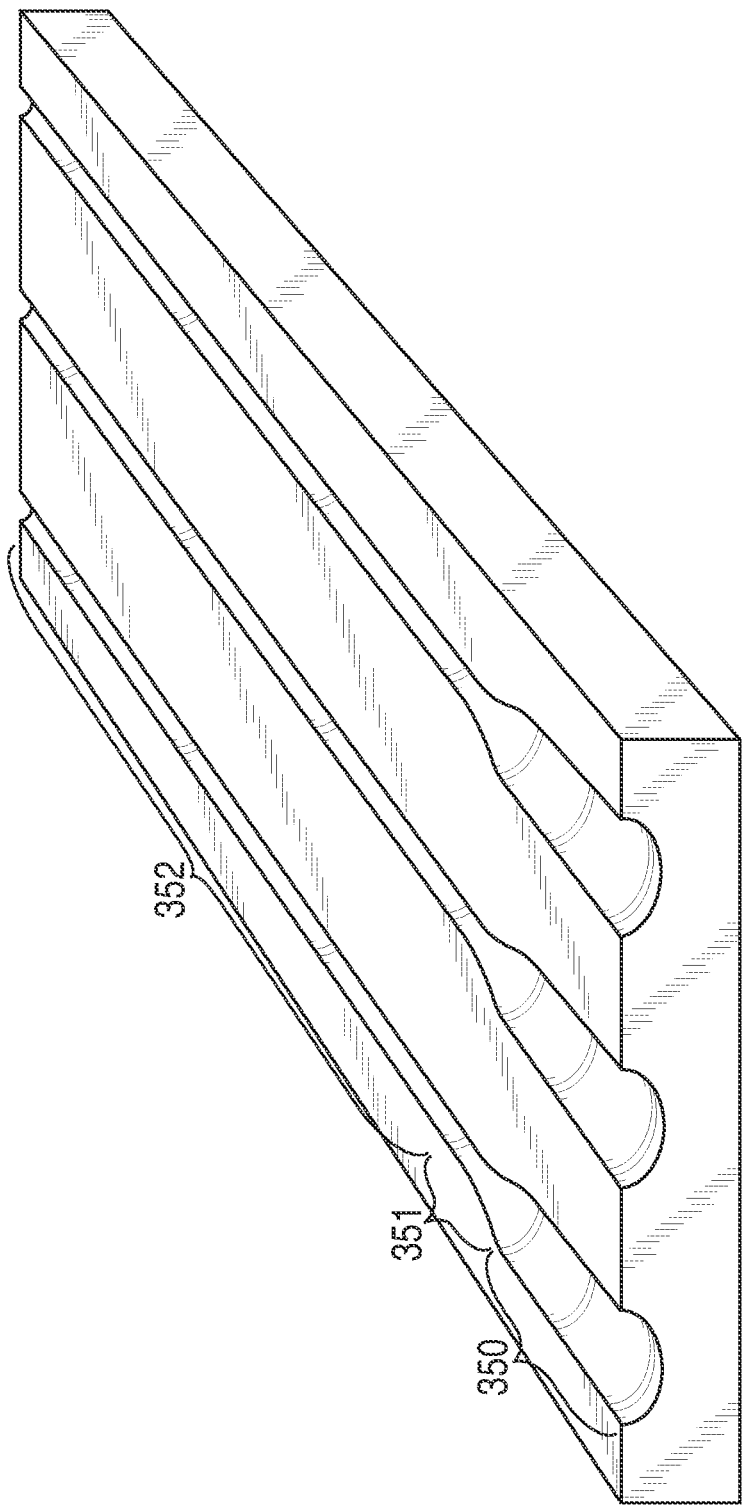

As another example, FIG. 3C shows an illustrative bottom mold for forming bottom-component sheath for one leg of a cable structure. As shown, this bottom mold is constructed to manufacture multiple legs. The molds can all be the same to produce multiple copies of the same cable structure (e.g., multiple main legs 22) or different cable structures (e.g., one of each leg 22, 24, and 26). Regardless of which leg is molded, the mold includes interface region 350, bump region 351, and non-interface region 352.

Referring back to FIG. 3A, top and bottom molds 302 and 304 can be constructed from any suitable material capable of permitting a vacuum to be pulled in the directions shown the by arrows 312. Top and bottom molds 302 and 304 may be constructed from a porous material (e.g., aluminum) or can include illustrative vacuum channels 314. A vacuum is applied to pull top sheet 306 onto top mold 302 and another vacuum is applied to pull bottom sheet 308 onto bottom mold 304. The vacuum can hold top and bottom sheets 306 and 308 in place when top and bottom molds 302 and 304 are pressed together.

Top and bottom molds 302 and 304 can be heated to promote molding of sheets 306 and 308. The heat and vacuum and can cause sheets 306 and 308 to deform into respective mold cavities of top and bottom molds 302 and 304. Top and bottom molds 302 and 304 can be heated, for example, by being inserted into an oven or by using internal heating elements (not shown). When molds 302 and 304 are compressed together, the heat and pressure can cause sheets 306 and 308 to mold together, thereby forming the bi-component cable structure. After the bi-component cable structure is molded, the excess urethane is stripped away.

Inlaid component 310 represents any component or combination of components placed into the cavity of bottom mold 304 prior to formation of the bi-component sheath. In one embodiment, inlaid component 310 can be a conductor bundle. The conductor bundle can be secured in place to maintain a predetermined position within the cavity existing between the bi-component sheath during the mold formation process, including during a resin application stage. For example, tension members (not shown) may used to hold the conductor bundle taut. In addition, an inlaid support member (not shown) may be used to further stabilize the conductor bundle. In another embodiment, inlaid component 310 can include one or more removable rods. The rods are used to form the shape of the bi-component sheath during compression. The rods can be secured in place using various support members, including an inlaid component support member.

Urethane sheets 306 and 308 form the top sheath component and the bottom sheath component, respectively of any cable structure manufactured using this method. Sheets 306 and 308 may be preformed or precut to assist inlaid component support members (not shown) in holding inlaid component 310 in place during cable structure manufacture. For example, the sheets may have one or more holes cut therein to permit inlaid component support member (not shown) direct access to inlaid component 310.

Figure 4A:
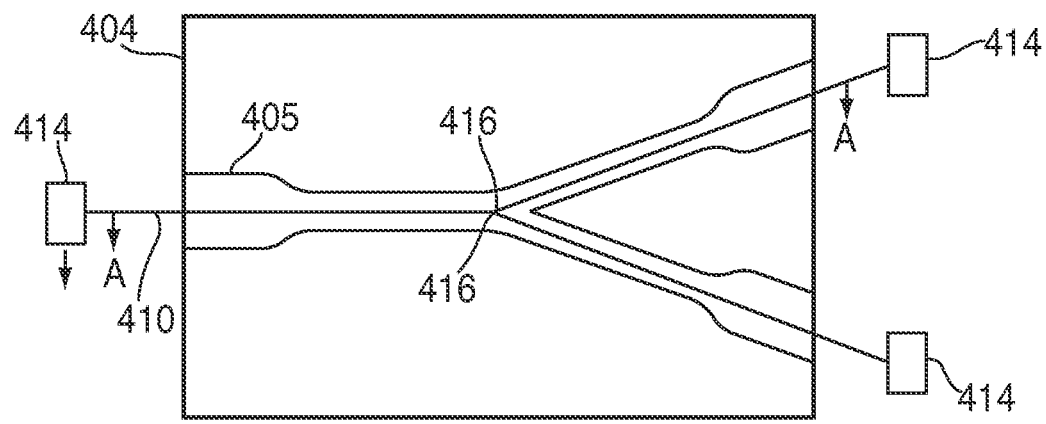
FIGS. 4A-B show illustrative views of a mold used to manufacture a single-segment cable in accordance with embodiment of the invention.

FIG. 4A shows an illustrative top view of bottom mold 404 constructed to mold the bottom sheath component of a jointly formed multi-leg cable structure in which conductor bundle 410 is inlaid prior to formation of the bi-component sheath. Assume a urethane sheath (not shown) is impressed in mold cavity 405. Conductor bundle 410 is secured above the urethane sheet by tension members 414. Tension members 414 secure conductor bundle 410 at all three legs of the cable to ensure adequate tension is provided during the molding process—this is to ensure that conductor bundle 410 is maintained in a concentric position within mold cavity 407 (of FIG. 4B) during the resin injection stage.

Conductor bundle 410 can also be secured by inlaid component support structure 416. Support structure 416 can secure conductor bundle 410 at the bifurcation region of mold 404. This can further ensure that conductor bundle remains in a concentric position within mold cavity 407. Support structure 416 can be any suitable structure such as pins, a ring, or rods.

Figure 4B:
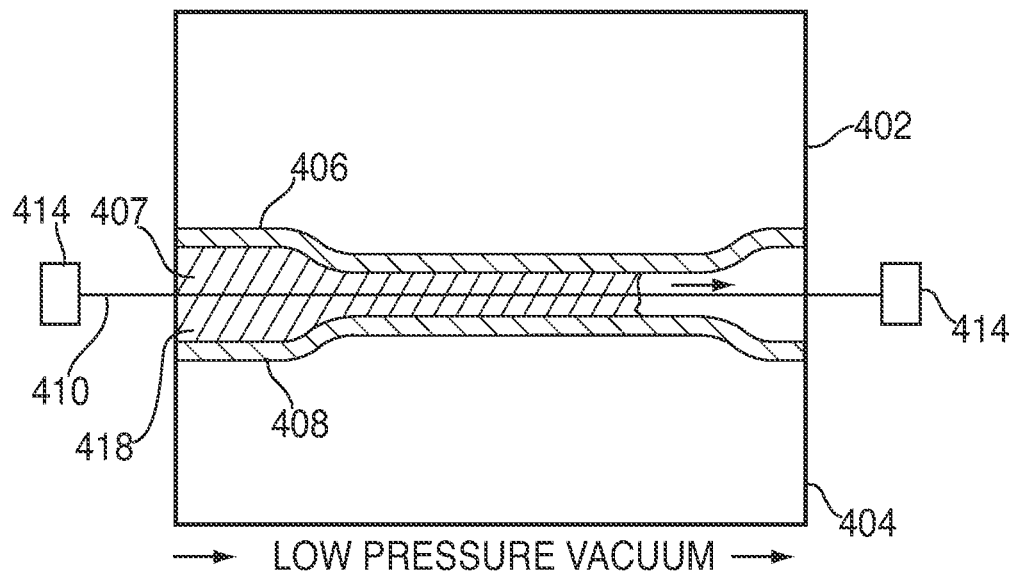

FIG. 4B shows an illustrative cross-sectional view of top mold 402 and bottom mold 404 compressed together. The cross-section may be taken along the line A-A of FIG. 4A (assuming the top mold is on top of the bottom mold). Top urethane sheet 406 and bottom urethane sheet 408 are shown. Resin 418 is shown being drawn by a low pressure vacuum through one end (e.g., main leg end) of mold cavity 407 existing within the bi-component sheath to the other ends (e.g., headphone ends). When the resin cures, it yields a cable having a cross-section such as cable structure 200 (of FIG. 2).

Top mold 402 and bottom mold 404 are compressed together using a relatively low pressure. For example, compression molding pressures are typically less than pressures used in injection molding processes. In addition, use of a low pressure vacuum to drawn resin in through mold cavity 407 also minimizes movement of bundle 410 and assists in maintaining an equal distribution of resin around the periphery of bundle 410.

Figure 5A:
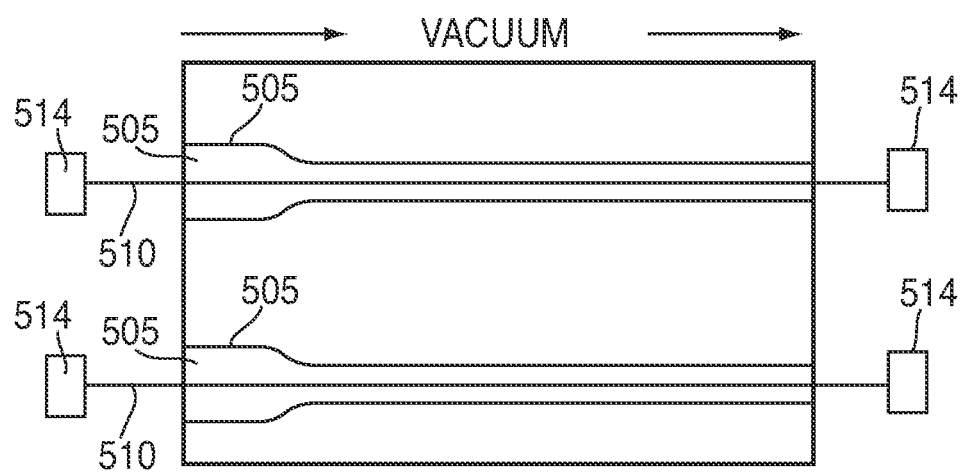
FIGS. 5A-B show illustrative views of a mold used to manufacture multiple legs of a multi-segment cable in accordance with embodiment of the invention.

FIG. 5A shows an illustrative top view of bottom mold 504 constructed to mold the bottom sheath component of a leg (e.g., a main leg) in which conductor bundle 510 is inlaid prior to formation of the bi-component sheath. Mold 504 has two mold cavities 505 for producing two cable structures. Conductor bundle 510 is secured by tension members 514. An inlaid support structure may not be needed because conductor bundle 510 does not pass through a bifurcation region.

Figure 5B:
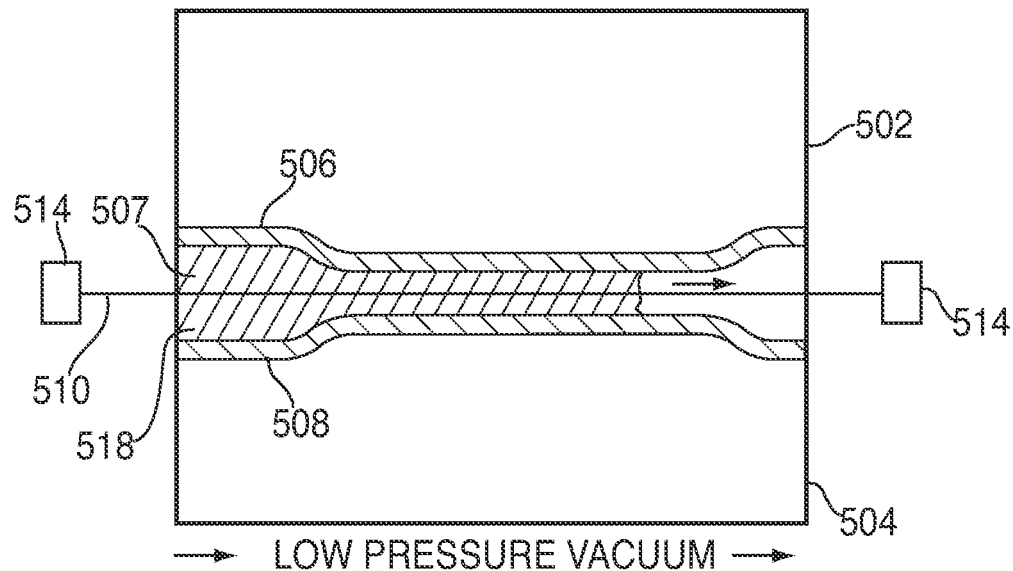

FIG. 5B shows an illustrative cross-section of top mold 502 and bottom mold 504 when compressed. Top urethane sheet 506 and bottom urethane sheet 508 are shown. Resin 518 is shown being drawn by a low pressure vacuum through one end of mold cavity 407 existing within the bi-component sheath to the other end. When the resin cures, it yields a cable having a cross-section such as cable structure 200.

Figure 6A:
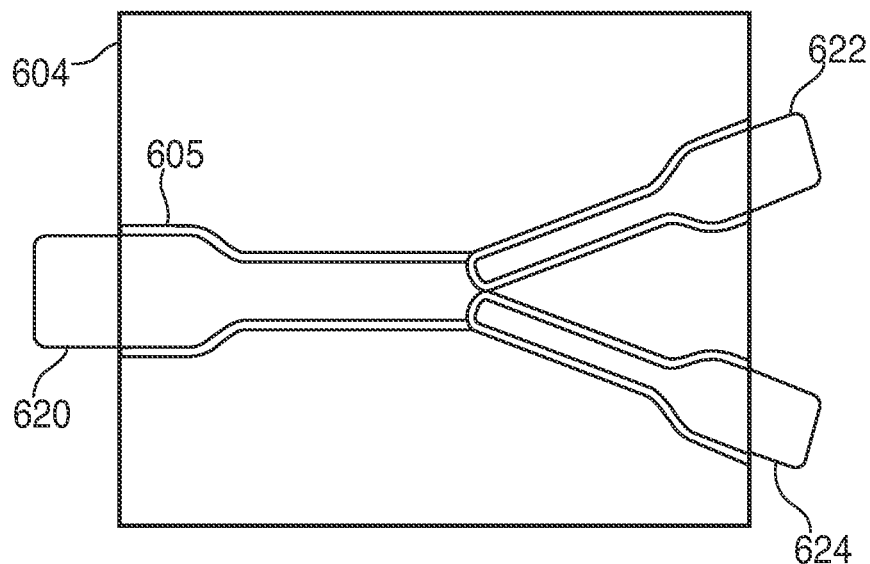
FIGS. 6A-B show illustrative views of a mold used to manufacture a single-segment cable in accordance with embodiment of the invention.

FIG. 6A shows an illustrative top view of bottom mold 604 constructed to mold the bottom sheath component of a jointly formed multi-leg cable structure in which removable rods are inlaid prior to formation of the bi-component sheath. Assume a urethane sheath (not shown) is impressed in mold cavity 605 before removable rods 620, 622, and 624 are placed into mold 604. Rods 620, 622, and 624 are used to assist forming the shape of the bi-component sheath during compression. After the bi-component sheath is formed, the rods are removed, yielding a hollow cable structure. A conductor bundle is inserted into the hollow cavity, secured in place (using tension members), and subjected to a resin application stage. The rods may be covered with a low friction coating (e.g., Teflon) to promote ease of removal from the bi-component sheath. In another approach, which is shown in FIGS. 7A and 7B, the rods may be jacketed with a tube sleeve, which becomes affixed to the inner wall of the bi-component sheath, but enables the rod to be easily extracted.

Rod 620, 622, and 624 may be secured in place to prevent them from moving during formation of the bi-component sheath. The rods for each leg can be secured in place by support structure remote from the mold and internal to the mold. For example, a fixture can hold one end of rod 620 in place and an inlaid support structure can hold the other end of rod 620 in place. Holding the rods in place can assist in forming a bi-component sheath of uniform thickness.

Figure 6B:
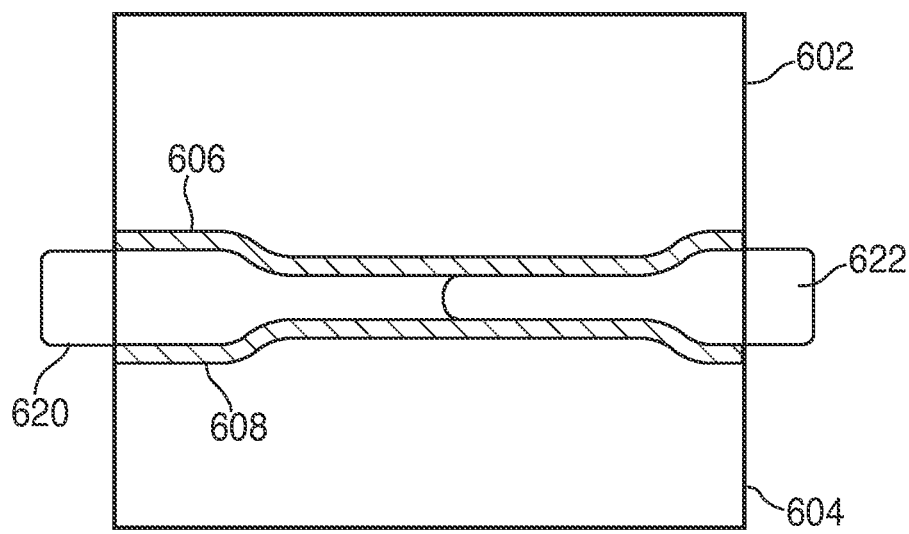

FIG. 6B shows an illustrative cross-section of top mold 602 and bottom mold 604 when compressed. Top urethane sheet 606 and bottom urethane sheet 608 are shown wrapped around rods 620 and 622. Rods 620 and 622 (and 624 not shown) can be constructed to seamlessly interface with each other at the bifurcation region. The seamless integration may prevent sheets 606 or 608 from seeping into any joints or cracks between the rods during the bi-component sheath mold formation. Alternatively, the integration of the rods at the bifurcation region may constructed to permit controlled seepage of sheets 606 and 608 to form an inlaid component support structure. This support structure can be used to assist in securing a conductor bundle.

Figure 7A:
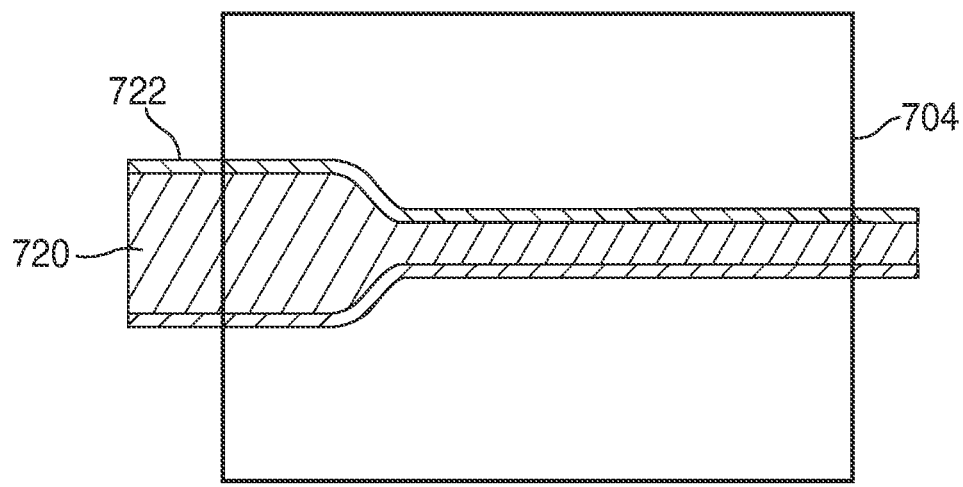
FIGS. 7A-B show illustrative views of a mold used to manufacture a leg of a multi-segment cable in accordance with embodiment of the invention.
Figure 7B:
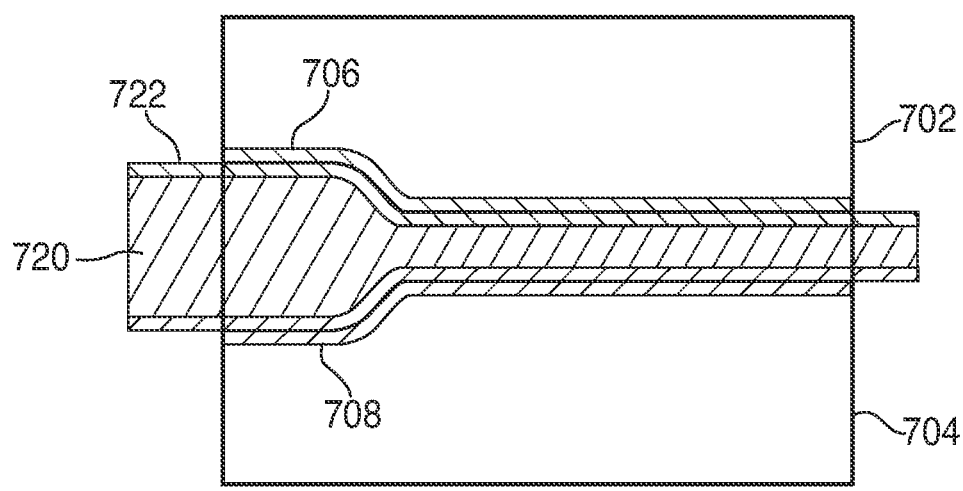

FIG. 7A shows an illustrative top view of bottom mold 704 constructed to mold the bottom sheath component of a leg of a cable structure in which removable rod 720 is inlaid prior to formation of the bi-component sheath. Rod 720 is jacketed with tube sleeve 722, which is constructed to permit rod 720 to be easily removed after the bi-component sheath is formed. FIG. 7B shows a cross-sectional view of mold 702 and 704 compressed together to form the bi-component sheath from top and bottom sheets 706 and 708. If an inlaid support member is used, it preferably does not pierce the tube. After rod 720 is removed and a conductor bundle (not shown) is inserted, secured, and subjected to resin application, the resulting cross-section can be similar to cable structure 210 of FIG. 2.

Figure 8:
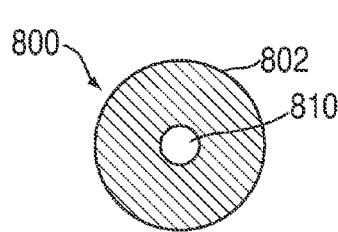
FIG. 8 shows a cross-sectional view of a cable structure manufactured using a resin in accordance with embodiment of the invention.

FIG. 8 shows illustrative cross-sectional view of a cable structure that can be manufactured using a low-pressure vacuum to draw a resin through a mold in accordance with an embodiment of the invention. The illustrated cross-sectional view represents a cross-sectional view of a leg of a cable structure. Cable structure 800 shows resin 802 encapsulating conductor bundle 810. No urethane sheet is used to form a sheath of cable structure 800. Rather, resin 802 forms the sheath of cable structure 800.

Cable structure 800 can be manufactured using a direct wire inlaid resin sheath molding process. This process is similar to the process discussed above in connection with FIG. 3A and FIGS. 4A and 4B, except that the urethane sheets are not used. In particular, cable structure 800 can be manufactured as follows. A conductor bundle is secured in place above a bottom mold, and a top mold is mated flush against the bottom mold. When the two molds are mated together, a low pressure vacuum is applied to draw a resin from one side of the flush mated mold to the other side of the mold. The resin is cured, and the mold halves are separated, thereby yielding cable structure 800.

The resin used in various embodiments discussed herein can be a polyurethane, a thermoset polyurethane, or a dual liquid set polyurethane.

Figure 9:
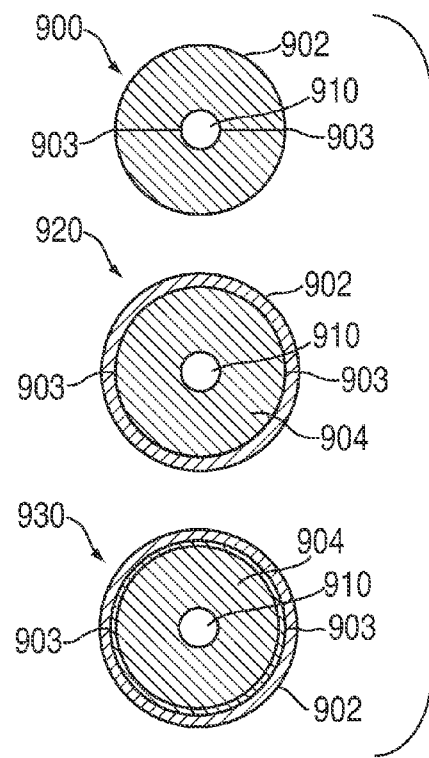
FIG. 9 shows cross-sectional views of a cable structure manufactured with silicon sheets in accordance with embodiments of the invention.

FIG. 9 shows illustrative cross-sectional views of a cable structure that can be manufactured by compression molding two silicon or thermoplastic sheets in accordance with embodiments of the invention. The illustrated cross-sectional views represent a cross-sectional view of a leg of a cable structure. Cable structure 900 shows silicon 902 encapsulating conductor bundle 910. Silicon 902 forms a bi-component sheath around bundle 910 that directly interfaces with bundle 910. Mold interface region 903 illustrates the region where a top silicon sheet is molded to a bottom silicon sheet. Cable structure 910 can be manufactured using a direct wire inlaid bi-component sheath molding process, which is similar to the same process discussed above.

Cable structure 920 has bi-component silicon sheath 902 filled with resin 904, which encapsulates bundle 910. Cable structure 930 is similar in every respect to cable structure 920, except for the addition of tube sleeve 906. Tube sleeve 906 directly interfaces with the inner diameter of the bi-component sheath and resin 206. Cable structures 920 can be manufactured using a tube-inlaid bi-component sheath molding process, which is similar to the same process discussed above.

Figure 10A:
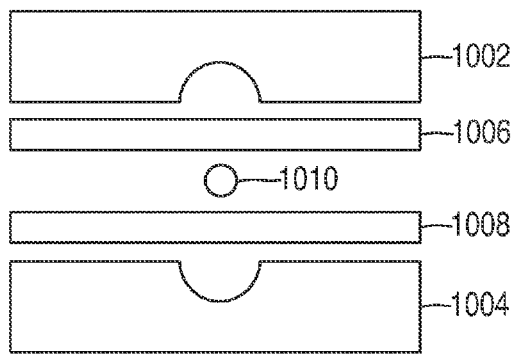
FIGS. 10A-B show different molds in accordance with embodiments of the invention.

FIG. 10A shows a simplified exploded cross-sectional view of top mold 1002, bottom mold 1004, top silicon sheet 1006, bottom silicon sheet 1008, and inlaid component 1010 (e.g., conductor bundle or removable rod) used to manufacture a silicon-based cable structure according to an embodiment of the invention. Top and bottom molds 1002 and 1004 can be constructed to mold either a single-segment cable structure or a multi-segment cable structure. Top and bottom molds 1002 and 1004 each have a cavity for shaping the cable structure. For example, the molds can be same as those shown in FIGS. 3B and 3C. If desired, the molds can be constructed to yield multiple cable structures.

Many of the same attributes discussed above in connection with FIGS. 3-7 are applicable to various manufacturing processes for making silicon based cable structures, with a few exceptions. Silicon material requires higher heat and pressure to form the bi-component sheath than urethane. Therefore, molds 1002 and 1004 may be constructed to handle higher temperatures. In addition, a vacuum may not be needed to hold the silicon sheets in place during a compression event, therefore solid, non-porous materials can be used.

Figure 10B:
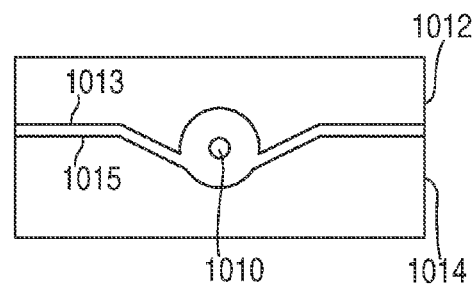

FIG. 10B shows an illustrative cross-sectional view of a mold that be used to compress silicon sheets in accordance with an embodiment of the invention. Top and bottom molds 1012 and 1014 are constructed with cavities 1013 and 1015 conducive for holding inlaid component 1010 in place. For example, cavity 1015 can be deeper than cavity 1013 so that inlaid component can be securely held in place in the bottom mold.

The silicon sheets can have preformed channels or can be cut prior to being compression molded together. FIGS. 11A-C and FIGS. 12A-B illustrate different preformed sheets. Referring now to FIG. 11A, a preformed silicon sheet having a cavity for forming a single-segment cavity structure is shown. FIG. 11B is an enlarged view of bifurcation region 1102. As shown, an inlaid support structure 1104 is constructed in the silicon sheet. FIG. 11C shows a cross-sectional view taken along lines C-C of FIG. 11A. FIG. 11C shows legs 1105 and ring 1106 of inlaid structure 1104. Ring 1106 may secure a conductor bundle in place during a compression molding event.

FIG. 12A shows illustrative top and bottom silicon sheets 1202 and 1204, and FIG. 12B shows a perspective view of bottom sheet 1204. Top and bottom sheets 1202 and 1204 may be used to form a leg of a cable structure. The non-cavity portions 1205 of sheets 1202 and 1204 can be constructed to have a flush fit when compressed together. Cavity 1207 and cavity 1206 form a hollow tube, in which an inlaid component (not shown) can be contained. The hollow cavity secures the inlaid component in place during the molding process.

Another silicon sheet that can be used in the silicon-based molding process can be a sheet with a conductor bundle integrated within the sheet. For example, a silicon sheet can be injected molded around a conductor bundle. This sheet is then placed in a mold to obtain the desired shape needed for the single-segment cable structure or leg of a multi-segment cable structure.

Figure 13:
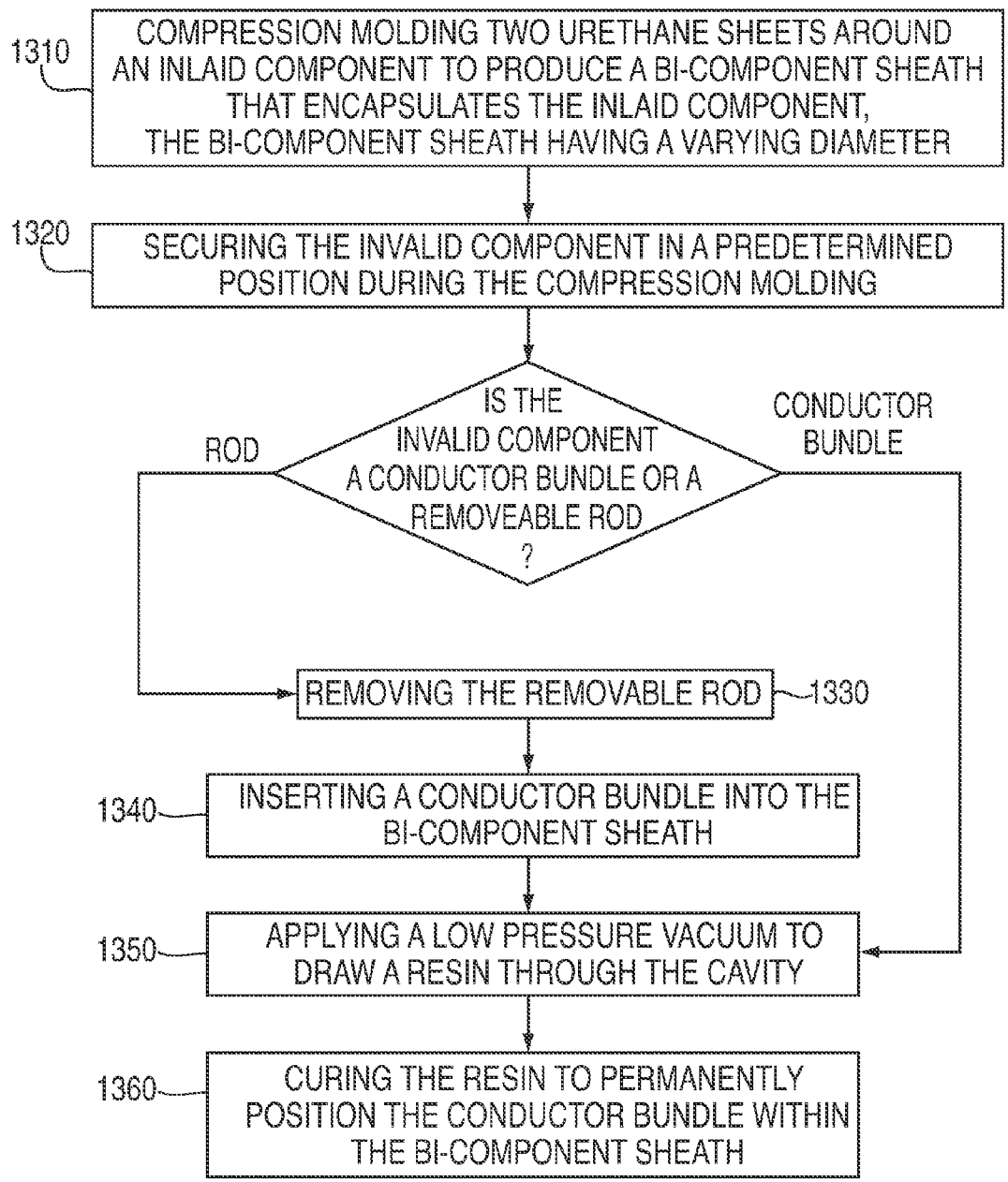
FIGS. 13-15 show flowcharts of illustrative steps that may be performed to manufacture a cable structure in accordance with embodiments of the invention.

FIG. 13 illustrates steps that may be performed to manufacture a cable structure in accordance with an embodiment of the invention. Starting at step 1310, two urethane sheets are compression molded around an inlaid component to produce a variable diameter bi-component sheath that encapsulates the inlaid component. At step 1320, the inlaid component can be secured in a predetermined position during the compression molding event. If the inlaid component is a conductor bundle, the process can jump to step 1350, which applies a low-pressure vacuum to draw a resin through a cavity existing within the bi-component sheath. At step 1360, the resin is cured to permanently position the conductor bundle within the bi-component sheath. If the inlaid component is a removable rod, the process proceeds to step 1330, where the removable rod is removed. Then at step 1340, a conductor bundle in secured in placed within the bi-component sheath. After the conductor bundle is secured, the process proceeds to step 1350.

Figure 14:
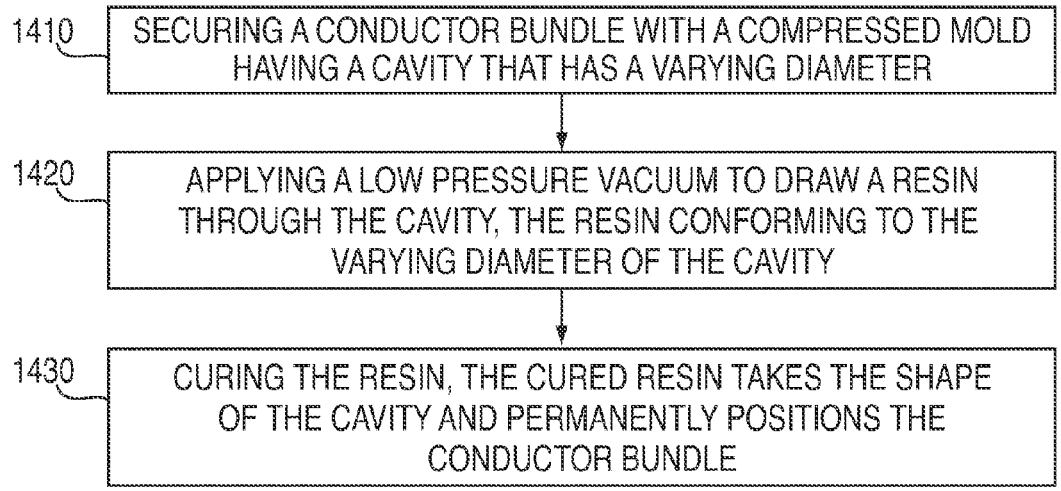

FIG. 14 illustrates steps that may be performed to manufacture a cable structure in accordance with an embodiment of the invention. Starting at step 1410, a conductor bundle is secured within a compressed mold having a cavity that has a varying diameter. At step 1420, a low pressure vacuum is applied to draw a resin through the cavity, the resin conforming to the varying diameter of the cavity. Then, at step 1430, the resin is cured to takes the shape of the cavity and permanently position the conductor bundle.

Figure 15:
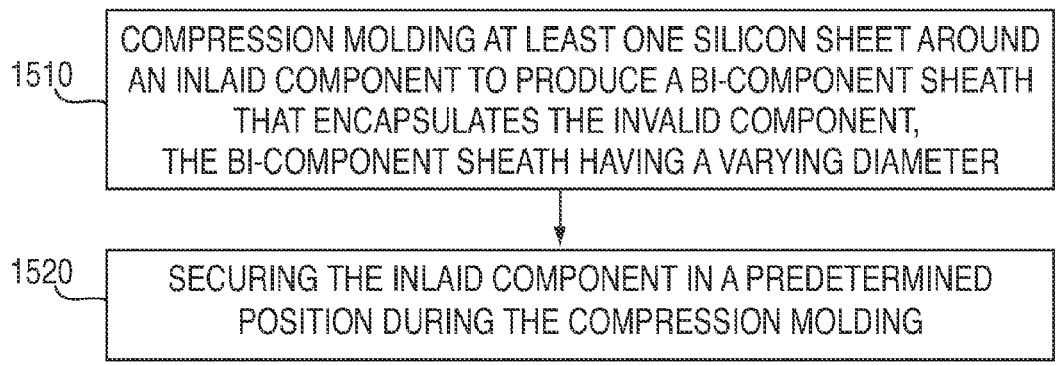

FIG. 15 illustrates steps that may be performed to manufacture a cable structure in accordance with an embodiment of the invention. Starting at step 1510, at least one silicon sheet is compression molded around an inlaid component to produce a bi-component sheath that encapsulates the inlaid component. The bi-component sheath has a varying diameter. At step 1520, the inlaid component is secured in a predetermined position during the compression molding. The inlaid component can be a conductor bundle or a removable rod.

It should be understood that processes of FIGS. 13-15 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A cable structure, comprising:
  a conductor bundle;
  a cured resin that encompasses the conductor bundle;
  a tube sleeve having an inner surface and an outer surface, the tube sleeve encompassing the cured resin; and
  a variable diameter bi-component sheath compression molded from two urethane sheets that encompasses the tube sleeve, the cured resin, and the conductor bundle; wherein
  each component of the bi-component sheath defines at least a portion of an external surface of the cable structure;
  the outer surface of the tube sleeve mates to an inner surface of the bi-component sheath:
  the inner surface of the tube sleeve mates to an outer surface of the cured resin; and
  the bi-component sheath comprises interface region, a bump region, and a non-interface region, the bump region existing between the interface and non-interface regions and having a variable diameter.

2. The cable structure of claim 1, wherein the bump region has a curved profile.

3. The cable structure of claim 1, wherein the variable diameter bi-component sheath comprises three legs coupled together at a bifurcation region, each leg comprising an interface region, a bump region, and a non-interface region, wherein the bump region exists between the interface and non-interface regions and has a variable diameter.

4. The cable structure of claim 1, wherein the bi-component sheath comprises a top sheath component formed from a first of the two urethane sheets and a bottom sheath component formed from a second of the two urethane sheets, wherein the top and bottom sheath components each have a smooth outer surface.

5. The cable structure of claim 1, wherein the conductor bundle comprises at least one conductor and at least one superelastic rod.

6. A cable structure, comprising:
  a variable diameter bi-component sheath compression molded from two urethane sheets;
  a tube sleeve disposed within the sheath such that a cavity exists within the tube sleeve disposed within the sheath, wherein the bi-component sheath comprises at least one leg having an interface region, a bump region, and a non-interface region, the bump region existing between the interface and non-interface regions and having a variable diameter; and
  a support structure positioned at one end of the non-interface region and comprising:
    a central ring portion; and
    a leg portion attached to the central ring portion, the leg portion extending to the external surface of the cable structure;
  wherein:
    each of the two urethane sheets defines at least a portion of a smooth external surface of the cable structure; and
    the tube sleeve is mated to an inner surface of the sheath.

7. The cable structure of claim 6, wherein the bi-component sheath comprises three legs joined together at a bifurcation region, and the cavity exists with all three legs.

8. The cable structure of claim 7, wherein each of the three legs has an interface region, a bump region, and a non-interface region, wherein the bump region exists between the interface and non-interface regions and has a variable diameter.

9. The cable structure of claim 8, wherein dimensions of the interface regions, bump regions, and non-interface regions for at least two of the three legs are substantially the same.

10. A cable structure, comprising:
  an inlaid component comprising:
    a central ring portion; and
    a leg portion attached to the central ring portion;
  a resin that encompasses the inlaid component, the resin having an outer surface, the resin comprising:
    an interface region;
    a bump region; and
    a non-interface region, the bump region existing between the interface and non-interface regions and having a variable diameter; and
  a tube sleeve that at least partially encompasses the outer surface of the resin; wherein
  the resin permanently secures the inlaid component in place.

11. The cable structure of claim 10, wherein the bump region comprises a curve.

12. The cable structure of claim 10, wherein the resin comprises three legs coupled together at a bifurcation region, each leg comprising an interface region, a bump region, and a non-interface region, wherein the bump region exists between the interface and non-interface regions and has a variable diameter.

13. The cable structure of claim 12, wherein each bump region comprises a curve.

14. The cable structure of claim 10, wherein the inlaid component further comprises at least one conductor and at least one superelastic rod.

15. The cable structure of claim 10, wherein the inlaid component comprises a conductor bundle.

16. The cable structure of claim 10, wherein an interface between the resin and the inlaid component minimizes movement of the inlaid component within the resin.

17. The cable structure of claim 16, wherein the resin is pulled around the inlaid component by a vacuum.

* * * * *